Feb. 6, 1923.

H. H. LAMPERT.
STEERING WHEEL LOCKING MECHANISM.
FILED FEB. 1, 1922.

1,443,958

Patented Feb. 6, 1923.

1,443,958

UNITED STATES PATENT OFFICE.

HENRY H. LAMPERT, OF CHICAGO, ILLINOIS.

STEERING-WHEEL-LOCKING MECHANISM.

Application filed February 1, 1922. Serial No. 533,264.

*To all whom it may concern:*

Be it known that I, HENRY H. LAMPERT, a citizen of the United States of America, and a resident of Chicago, county of Cook, and State of Illinois, have invented a new and useful Improvement in Steering-Wheel-Locking Mechanism, of which the following is a specification.

The main objects of this invention are to provide an improved locking device for steering wheels of motor vehicles; to provide an improved locking device which allows the steering wheel to be manipulated in one direction so as to permit the vehicle to be moved in the arc of a circle a short distance from where it is parked if the occasion so demands when the driver is not at hand, but which secures the steering wheel against manipulation in the reverse direction and thereby prevents the vehicle from being moved along a straight path so as to prevent an unauthorized person from obtaining possession of the car; and provide a locking device of this kind which is particularly adapted for use with the steering mechanism of a Ford automobile.

An illustrative embodiment of this invention is shown in the drawings, in which

Figure 2:
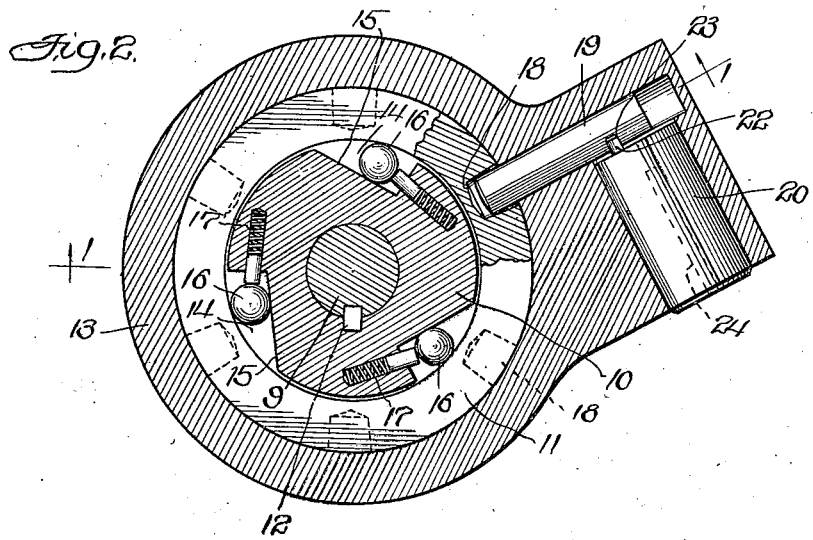
Figure 2 is a horizontal sectional view taken on the line 2—2 of Figure 1, the line 1—1 on said figure representing the plane of the section shown in Figure 1.
Figure 1:
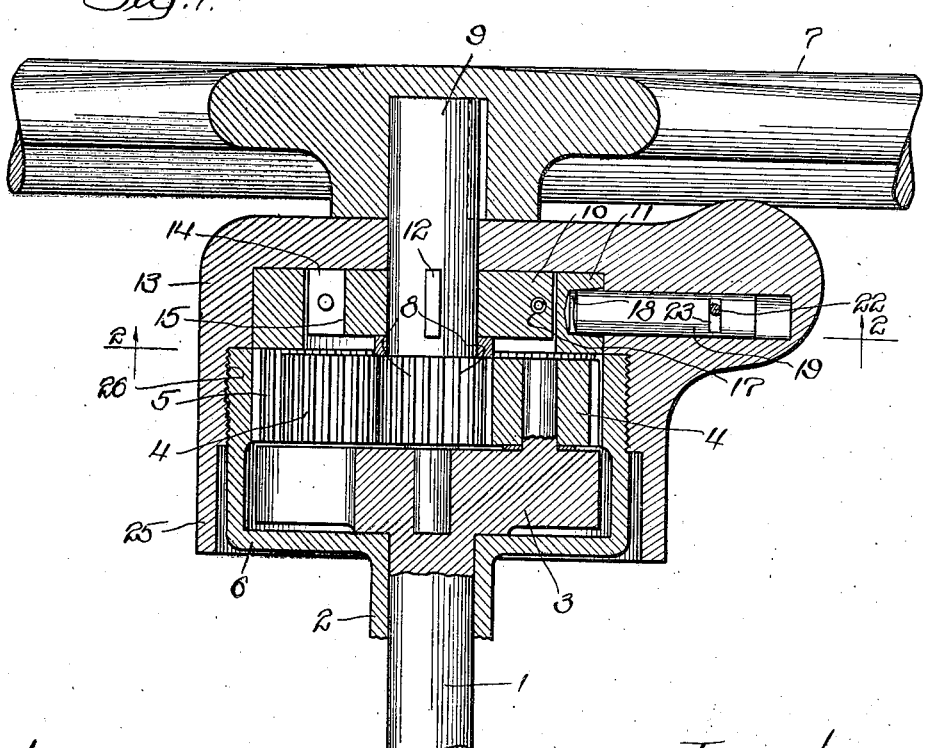
Figure 1 is a vertical sectional elevation of a locking device constructed in accordance with this invention and applied to the conventional steering mechanism of a Ford automobile.

A locking device constructed in accordance with this invention involves the use of a pair of co-axially arranged members having coacting means arranged there-between which are adapted to secure said members against relative rotation in one direction, one of the members being rigidly secured to the steering shaft and the other being adapted to be secured against rotation relative to the steering shaft housing by means of a locking bolt, the shifting of which is controlled by a key operated eccentric.

In the drawings the improved locking device is shown as applied to the conventional steering mechanism of a Ford automobile which generally comprises a steering shaft 1 mounted in a housing 2, the shaft being secured at its upper end to a frame 3 which carries the usual pinions 4 arranged to mesh with a gear 5 formed in an enlarged part 6 of the housing 2. The steering action of the wheel 7 is communicated to the shaft 1 through the medium of a pinion 8 mounted on the inner end of a stud shaft 9 connected to said steering wheel 7 which gear meshes with the pinion 4.

In the specific embodiment herein shown the locking device comprises a pair of members 10 and 11 the one in the form of a disc secured to the stud shaft 9 by means of a key 12 and the other in the form of a ring concentrically arranged with respect to the disc and rotatably mounted in a housing or cap 13 which is adapted to screw onto the enlarged part 6 of the steering shaft housing 2. The disc 10 has a plurality of recesses 14 formed in the periphery thereof which is opposed to the ring 11 so as to provide a plurality of surfaces 15 inclined to the inner periphery of the ring 11. Balls 16 are located in the recesses 14 and normally urged by springs 17 outwardly toward the opposed periphery of the ring 11. These balls are in the nature of an overrunning clutch which tends to secure the ring 11 against rotation relative to the disc 10 in one direction.

The ring 11 is normally free to rotate relative to the housing or cap 13. The outer periphery thereof is provided with a plurality of recesses 18 into which the end of a locking bolt 19 is adapted to fit for the purpose of securing the ring 11 against rotation relative to the housing or cap 13.

The locking bolt 19 is shiftable into and out of position to engage one of the recesses 18 through the action of a barrel 20 journaled in an offset 21 integrally formed on the housing or cap 13, said barrel having an eccentrically arranged pin 22 which rides in a transversely disposed groove 23 formed in the end of the locking bolt 19. The barrel 20 is a part of the conventional form of lock usually used for this purpose the same being provided with a keyway 24 to receive a key whereby the barrel is released from its casing so that it may be rotated.

The housing or cap 13 is provided with a flange 25 depending below the threads 26 of the cap so as to form a protecting apron extending down to and flush with the bottom of the enlarged part 6 of the steering shaft housing 2.

The operation of the locking mechanism herein shown and described is substantially as follows: When the locking bolt 19 is retracted the ring member 11 is free to rotate in either direction relative to the housing or cap 13. Thus the steering wheel 7 may be operated in its usual manner to actuate the steering shaft 1. When it is desired to lock the motor vehicle during the absence of the driver the locking bolt 19 is shifted through the rotation of the barrel 20 so that the inner end of the locking bolt becomes seated in one of the recesses 18 of the ring member 11. If thereafter an attempt is made to turn the steering wheel 7 in the direction of the arrow 27 the balls 16 under the influence of the spring 17 will wedge in between the surfaces 15 and the inner periphery of the ring member 11 and prevent rotation of the steering wheel in such direction. However, if the steering wheel 7 is rotated in the direction opposite to the arrow 27 the ball 16 will be retracted against the action of the springs 17 and permit the rotation of the disc 10 relative to the ring member 11 so that the usual steering action will result. However, having been turned in the latter direction the disc 10 becomes locked to the ring 11 as hereinbefore explained and prevents a reverse movement of the steering wheel 7.

Thus an automobile equipped with a locking mechanism of this kind may have the front wheels thereof turned slightly so as to permit the car to be moved from one side of the street to the other during the absence of the driver if the occasion should arise as for example in case of a fire. However, an unauthorized person could not drive away with the vehicle for the reason that having once turned the front wheels as permitted by the locking mechanism he would not be able to straighten them wherefor the vehicle could only be moved in a circular path.

Although but one specific embodiment of this invention has been herein shown and described, it will be understood that numerous details of the construction shown may be altered or omitted without departing from the spirit of this invention as defined by the following claims.

I claim:

1. A locking device of the class described comprising a housing, a steering-wheel shaft rotatable in said housing, a pair of coaxially arranged members one of which is secured to rotate with said shaft and the other of which is normally free to rotate relative to said housing and said shaft, coacting means between said members normally causing them to rotate together when said shaft is turned in one direction, and locking means for securing said other member against rotation relative to said housing.

2. A locking device of the class described comprising a housing, a steering-wheel shaft rotatable in said housing, a pair of members concentrically arranged one within the other one of which is secured to rotate with said shaft and the other of which is normally free to rotate relative to said housing and said shaft, coacting means between the opposed faces of said members normally causing them to rotate together when said shaft is turned in one direction, and locking means for securing said other member against rotation relative to said housing.

3. A locking device of the class described comprising a housing, a steering-wheel shaft rotatable in said housing, a disc secured to said shaft, a ring coaxially arranged with respect to said disc, coacting gripping means arranged between the opposed faces of said disc and ring, resilient means normally urging said gripping means into gripping position so as to cause said ring to rotate with said disc in one direction, and locking means for securing said ring against rotation relative to said housing.

4. A locking device of the class described comprising a housing, a steering-wheel shaft rotatable in said housing, a pair of coaxially arranged members one of which is secured to rotate with said shaft and the other of which is normally free to rotate relative to said housing and said shaft, one of said members having recesses in the face thereof which is opposed to the other member, balls located in said recesses, springs normally urging said balls outwardly along said faces and against the periphery of said other member whereby said members will be caused to rotate together in one direction, and locking means for securing said other member against rotation relative to said housing.

5. A locking device of the class described comprising a housing, a steering-wheel shaft rotatable in said housing, a disc secured to said shaft, a ring concentrically arranged around said disc in substantially the same plane thereof, said disc having recesses formed in the periphery thereof, so as to provide a plurality of inclined faces opposed to the inner periphery of said ring, balls located in said recesses, springs normally urging said balls outwardly along said inclined faces to bear against the inner periphery of said ring whereby said ring will be caused to rotate with said disc in one direction, and locking means adapted to secure said ring against rotation relative to said housing.

6. A locking device of the class described comprising a housing, a steering-wheel shaft rotatable in said housing, a pair of coaxially arranged members one of which is secured to rotate with said shaft and the other of which is normally free to rotate relative to said housing and said shaft, coacting means between said members normally causing them to rotate together when said shaft is turned in one direction, said other member having a plurality of recesses formed in the periphery thereof, a locking bolt reciprocatingly mounted in said housing, and a key operated eccentric journaled in said housing and adapted to shift said bolt into and out of position to be seated in one of said recesses for locking said other member against rotation relative to said housing.

7. A locking device of the class described comprising a housing, a steering-wheel shaft rotatable in said housing, a disc secured to said shaft, a ring coaxially arranged with respect to said disc, coacting gripping means arranged between the opposed faces of said disc and ring, resilient means normally urging said gripping means into gripping position so as to cause said ring to rotate with said disc in one direction, said ring having a plurality of recesses formed on one face thereof, a locking bolt reciprocatingly mounted in said housing, and a key operated eccentric journaled in said housing and adapted to shift said bolt into and out of position to be seated in one of said recesses for locking said ring against rotation relative to said housing.

Signed at Chicago this 24 day of Jan. 1922.

HENRY H. LAMPERT.